April 24, 1928.
C. C. ABBOTT
1,667,618
SOLDERING IRON
Filed Jan. 8, 1924
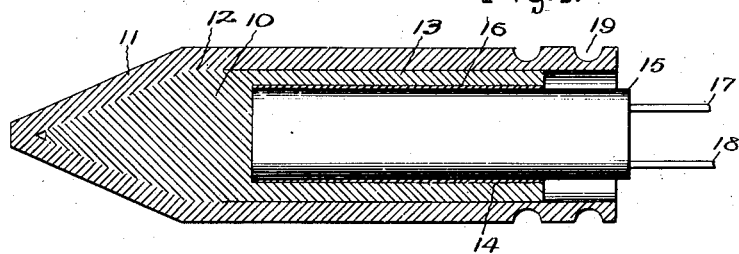
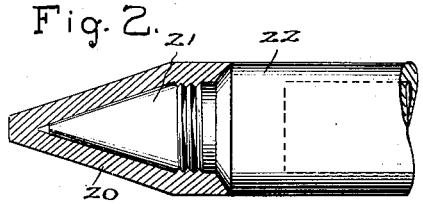 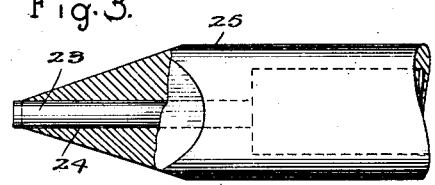
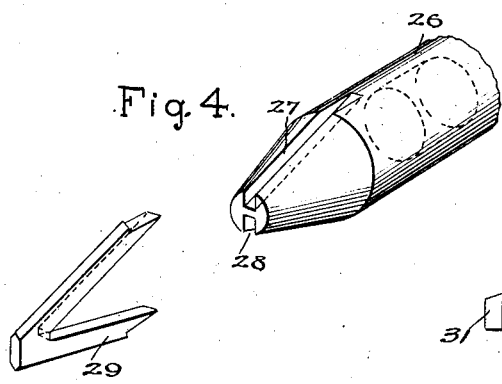 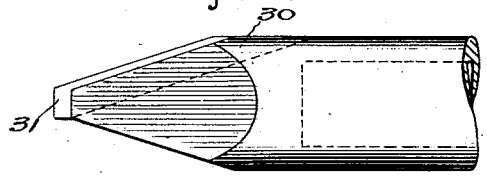
Inventor:
Charles C. Abbott,
by *Alexander S. —*
His Attorney.

Patented Apr. 24, 1928.

1,667,618

UNITED STATES PATENT OFFICE.

CHARLES C. ABBOTT, OF PITTSFIELD, MASSACHUSETTS, ASSIGNOR TO GENERAL ELECTRIC COMPANY, A CORPORATION OF NEW YORK.

SOLDERING IRON.

Application filed January 8, 1924. Serial No. 685,067.

My invention relates to soldering irons and has for its object the provision of a special working tip for soldering irons whereby the life of the iron is lengthened.

Soldering irons are ordinarily made of copper since this material has the high heat conductivity which is necessary for efficient operation of the iron. Copper, however, has the disadvantage that it is rapidly eaten away by the soldering flux or acid and otherwise wears away rapidly.

In carrying out my invention, I provide a special working tip on the soldering copper which tip is composed mainly of copper, whereby it has a satisfactory heat conductivity, and contains other metals making it resistant to acid and wear whereby the life of the soldering copper is materially lengthened.

For a more complete understanding of my invention, reference should be had to the accompanying drawing in which Fig. 1 is a view partially in section of an electric soldering iron embodying my invention; while Figs. 2, 3, 4 and 5 are views showing various modifications of my invention.

Referring to Fig. 1 of the drawing, I have shown my invention in one form as applied to an electrically heated soldering iron although it obviously has application to various other types of soldering irons. As shown, the soldering copper consists of an inner mass 10 of copper encased in a relatively thin outer protecting sheath 11, made of a suitable material which has good heat conductivity and which is resistant to the soldering flux or acid. I have found that an alloy containing approximately 64% copper, 21% zinc, 13% nickel, 1½% iron and a small amount of chromium is a very satisfactory material for this purpose. While this material does not conduct heat as efficiently as copper, I have found that by making the sheath 11 relatively thin as shown, heat is conducted through it to the tapered working surface at such rate that the working efficiency of the iron is highly satisfactory under ordinary conditions of operation. The sheath 11 is secured to the copper mass 10 by means of a brazed or welded joint 12 which extends over the tapered portion of the tip and back for a short distance whereby the sheath is secured in good heat conducting relation with the copper mass 10 in the vicinity of the working surface so that heat is rapidly and efficiently conducted to the sheath. This brazed joint is not required along the body 13 of the soldering iron remote from the working surface since a large proportion of the heat which may be conducted to the sheath at this point is wasted by radiation. In fact it is preferable to have a fairly loose fit between the mass 10 and the sheath around the body portion so that the joint will act to a certain extent as a heat insulator whereby a greater proportion of the heat is available for conduction to the working surface. The protecting sheath 11 may be removed and renewed if desired by heating to a temperature high enough to fuse the brazing material.

As shown, the soldering copper is electrically heated, the copper mass 10 being provided with a bore 14 in which a suitable heating unit 15, shown as a cartridge type, is inserted. A thin sleeve 16 made of a heat resisting material, such as a nickel chromium alloy, is provided between the heating unit 15 and the mass 10. The purpose of this sleeve 16 is to permit the removal of the heating unit since I have found that without the sleeve, the heating unit has a tendency to freeze or adhere to the mass 10 after it has been used for a short time. Preferably, the heating unit projects from the bore 14 for a short distance for the purpose of preventing overheating of the terminals 17 and 18 of the heating unit and also to permit its being grasped to pull it out. It will be understood that the soldering copper is provided with a suitable handle and, as shown, is provided with groove 19 for the attachment of a coiled wire handle such, for example, as disclosed in United States Patent No. 957,256 to Edwin W. Rice, Jr. dated May 10, 1910.

It will be observed that heat is conducted from the heating unit 15 through the copper mass 10 of high heat conductivity directly to the tip of the soldering copper where it is transferred to the sheath 11 and conducted through this relatively thin sheath to the working surface. Under similar conditions of service, I have found that where the average life of an ordinary soldering copper is approximately 60 days, the average life of a soldering copper provided with the protecting sheath of alloy is one year. Under these conditions the copper tip must be retinned every day and reshaped every three days, while the tip made of alloy in accordance with my invention need be retinned only once each month and reshaped every six months.

In the modified form of my invention shown in Fig. 2, the protecting sheath 20 is applied only to the tapered portion of the soldering copper; i. e., to the portion receiving the wear. The sheath or tip 20 is screwed on the reduced end 21 of the copper mass 22, the end 21 being provided with threads to receive the tip. When screwing the tip in place, a small amount of silver solder is preferably placed in it and the tip connected after heating both the tip and the mass 22 to a temperature high enough to melt the silver solder. A soldered joint is thus formed whereby the two parts are secured in good thermal relation. In case the soldering iron is heated during service to a temperature high enough to melt the silver solder, the protecting sheath 20 will be held in place by the threaded joint and upon cooling, the silver solder will solidify again. This tip may be easily removed and renewed if necessary by heating the iron to a temperature high enough to fuse the silver solder.

In the modified form shown in Fig. 3 a wear resisting tip made of alloy is provided in the form of a rod 23 which is inserted in a central bore 24 in the copper mass 25 and brazed or welded in place. As the working surface formed by the rod 23 wears away, it can be renewed by heating the soldering copper to a temperature high enough to melt the blazing material and then pushing the rod out slightly after which the exposed end is reshaped. This form, and also the forms shown in Figs. 4 and 5 has the advantage that the largest possible mass of copper is provided to conduct the heat to the working tip of alloy metal.

The modifications shown in Figs. 4 and 5 are somewhat similar. In the form shown in Fig. 4, the tapered portion of the copper mass 26 is provided with two oppositely disposed slots 27 and 28 in which a V-shaped member 29 made of the alloy metal is placed and secured by brazing. In Fig. 5, a single groove 30 only is provided in which a bar 31 of the alloy metal is placed and secured by brazing. The tip of alloy metal may be renewed in both of the forms shown in Figs. 4 and 5 by simply heating the soldering copper to a temperature high enough to fuse the brazing material.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. A soldering iron comprising a mass of copper, a protecting sheath for said mass provided with a working surface, and a soldered joint between said sheath and said mass in the vicinity of said working surface, said sheath fitting loosely over the remaining portion of said mass so as to provide an air space to obstruct the transfer of heat therefrom.

2. The combination with a soldering copper of a relatively thin protecting sheath fitting loosely over said soldering copper so as to provide an air space around said soldering copper to obstruct the transfer of heat therefrom, said sheath being provided with a working surface, and a soldered joint between said sheath and said soldering copper in the vicinity of said working surface whereby heat is conducted freely from said mass to said working surface.

In witness whereof, I have hereunto set my hand this 3rd day of January, 1924.

CHARLES C. ABBOTT.